US007509637B2

(12) United States Patent
Hussey

(10) Patent No.: US 7,509,637 B2
(45) Date of Patent: Mar. 24, 2009

(54) METHOD FOR AUTOMATICALLY UPDATING A COMPUTER REGISTRY

(75) Inventor: Thomas E. Hussey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 10/985,637

(22) Filed: Nov. 10, 2004

(65) Prior Publication Data

US 2005/0086641 A1    Apr. 21, 2005

Related U.S. Application Data

(63) Continuation of application No. 09/224,705, filed on Jan. 4, 1999, now Pat. No. 6,832,371.

(51) Int. Cl.
*G06F 9/44*    (2006.01)

(52) U.S. Cl. .................. 717/168; 713/100; 719/331

(58) Field of Classification Search ........................ None
See application file for complete search history.

(56) References Cited

U.S. PATENT DOCUMENTS

| | | | | |
|---|---|---|---|---|
| 4,849,876 | A | 7/1989 | Ozawa et al. | 711/207 |
| 5,412,808 | A | 5/1995 | Bauer | 707/1 |
| 5,619,716 | A | 4/1997 | Nonaka et al. | 717/167 |
| 5,630,076 | A | 5/1997 | Saulpaugh et al. | 710/104 |
| 5,758,154 | A | 5/1998 | Qureshi | 713/1 |
| 5,761,499 | A * | 6/1998 | Sonderegger | 707/10 |
| 5,978,579 | A * | 11/1999 | Buxton et al. | 717/107 |
| 5,986,667 | A | 11/1999 | Jevans | 345/619 |
| 6,192,375 | B1 * | 2/2001 | Gross | 707/200 |
| 6,230,159 | B1 | 5/2001 | Golde | 707/103 R |
| 6,330,567 | B1 * | 12/2001 | Chao | 707/200 |
| 6,418,555 | B2 | 7/2002 | Mohammed | 717/169 |
| 6,529,966 | B1 * | 3/2003 | Willman et al. | 710/10 |
| 6,564,369 | B1 | 5/2003 | Hove et al. | 717/121 |

OTHER PUBLICATIONS

Kelly, M., "Gain Control of Application Setup and Maintenance with the New Windows Installer." Microsoft System Journal, Sep. 1998, pp. 15-27.

* cited by examiner

*Primary Examiner*—Michael J Yigdall
(74) *Attorney, Agent, or Firm*—Workman Nydegger

(57) ABSTRACT

A method for automatically registering resources required for an application program module to execute. After the application program module is booted, a registration cache, which is stored in association with the application program module, is examined to determine its status. It indicates whether a registry on the computer system needs to be updated, e.g., after the user has moved files or renamed files. If so, a search is made through a predetermined directory to look for an application file or a dynamic link library file. If either is found, a resource fork in association with the file is opened, and it is determined whether there is a self-registration resource or an Object Linking and Embedded (OLE) Type Library (OTLB) in the resource fork. If found, any self-registration resource is registered by initiating a self-registration dynamic link library, and any OTLB resource is registered by initiating an OLE call.

23 Claims, 4 Drawing Sheets

METHOD FOR AUTOMATICALLY UPDATING A COMPUTER REGISTRY

RELATED APPLICATIONS

This application is a continuation of a commonly assigned patent application, Ser. No. 09/224,705, filed on Jan. 4, 1999 now U.S. Pat. No. 6,832,371, the benefit of the filing date of which is hereby claimed under 35 U.S.C. § 120.

TECHNICAL FIELD

This invention relates to computers and a registry stored on a computer. More particularly, this invention relates to a method for automatically updating the data stored in a registry when an application program module is booted.

BACKGROUND OF THE INVENTION

A registry is oftentimes used in a computer to store information about files. The registry is a database repository for information about a computer's configuration. It is organized in a hierarchical structure, and is comprised of subtrees and their keys, hives, and value entries. The registry keys, or keys, contain information that may be required for an application to run. Registry Keys are often paths to specific files.

Maintaining information in a registry is problematic due to a user's tendency to move folders and resources. For example, in the Macintosh version of the MICROSOFT OFFICE program module, or "MACOFFICE 4.2" program module, manufactured by Microsoft Corporation of Redmond, Wash., an installer program module was required to set the appropriate information in the registry. Several common user actions could render the "MACOFFICE 4.2" program module inoperative. For example, if a user changed something as minor as the hard drive name of their computer, the paths in the registry would be broken and the "MACOFFICE 4.2" program module would not work properly.

There were several other common actions that caused malfunctions in the registry in association with the "MACOFFICE 4.2" program module. Some of these actions that caused malfunctions were:

a user moving components from one location to another on the hard drive;
   a user renaming their hard drive;
   a user renaming several of the folders on their hard drive;
   a system administrator "pushing" an application program module to clients, such as by using the "NORTON ADMINISTRATOR" program module or the "APPLE NETWORK ADMINISTRATOR TOOLKIT", or "ANAT", program module;
   a user reinstalling the operating system;
   a user installing an operating system upgrade;
   a user dragging the appropriate components to the hard drive of the computer and placing them in the appropriate location;
   a user renaming a file; and
   a user moving the installer program module to another hard drive on the same computer.

All of these malfunctions originated from the registry, which is used by all Object Linking and Embedding (OLE) aware applications. Products such as the "ADOBE PAGEMAKER" program module, MACINTOSH version, also exhibit some of these malfunctions.

The "WINDOWS" version of the "OFFICE" program module, manufactured by Microsoft Corporation of Redmond, Washington, has solved some of the above-described problems using a self-registration application program module, known as the selfreg dynamic link library or selfreg.dll, installed on the computer. When the selfreg.dll is called, it stores registry keys in the registry. Thus, an installer program module is not needed to set the registry keys. The registry keys to be registered are stored in a .srg file, which is a pre-authored text file. When the selfreg.dll is called, the location of the .srg file is passed to the selfreg.dll. The selfreg.dll will then register all registry keys contained in the .srg file. Self-registration using the selfreg.dll is comparable to an installer program module registering the registry keys for an application program module.

However, there are several drawbacks to the selfreg.dll. For example, there is a need for someone to install the selfreg.dll before it will function. Another problem is that the selfreg.dll may get moved or deleted so that it will not function. Another drawback of the selfreg.dll is that there is the need for someone to install the .srg file. Another drawback of the selfreg.dll is that the .srg file may become out of sync with the selfreg.dll, causing the selfreg.dll to register an incorrect version of a registry key. Still another drawback is that the .srg file could be deleted or moved, causing the selfreg.dll to malfunction. Still another drawback is that someone needs to explicitly call the selfreg.dll, because it does not happen automatically.

Thus, there is a need for a method for automatically updating a computer registry. There is also a need for a method for automatically updating a computer registry after a user renames their hard drive, renames several of the folders on their hard drive, installs or reinstalls the operating system, renames a file, or moves the installer program module to another hard drive on the same computer. There is also a need for a method for automatically updating a computer registry when a system administrator "pushes" an application program module to clients.

There is also a need for a method for automatically updating a computer registry without the user having to install the selfreg.dll or the .srg file. There is also a need for a method for automatically updating a computer registry without the user having to explicitly call the selfreg.dll.

SUMMARY OF THE INVENTION

The present invention satisfies the above described needs by providing a method for automatically updating a registry stored on a computer when an application program module is booted.

In one aspect, the invention is incorporated into a computer system and is a method for automatically registering resources required for an application program module to execute.

The method begins when the application program module is booted. The status of a registration cache stored in association with the application program module is examined to determine whether a registry on the computer system needs to be updated. The registration cache is stored in association with the application program module and indicates whether a registry on the computer system needs to be updated, such as after the user has moved files or renamed files such that registry keys in the registry may no longer be valid.

If the registration cache indicates that the registry needs to be updated, then a search is made through a predetermined directory, such as the application program module folder. The search is looking for an application file or a dynamic link library file. Upon detecting an application file or a dynamic link library file, then a resource fork in association with the file is opened.

After opening the resource fork, it is determined whether there is a self-registration resource in the resource fork. If so, then the self-registration resource is registered by initiating a call to a dynamic link library, selfreg.dll. A determination is made whether there is an Object Linking and Embedding (OLE) Type Library (OTLB) resource in the resource fork. An OTLB resource is a resource containing binary data that describes how to register an OLE type library. If so, then the OTLB resource is registered by initiating an OLE call RegisterTypeLib.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
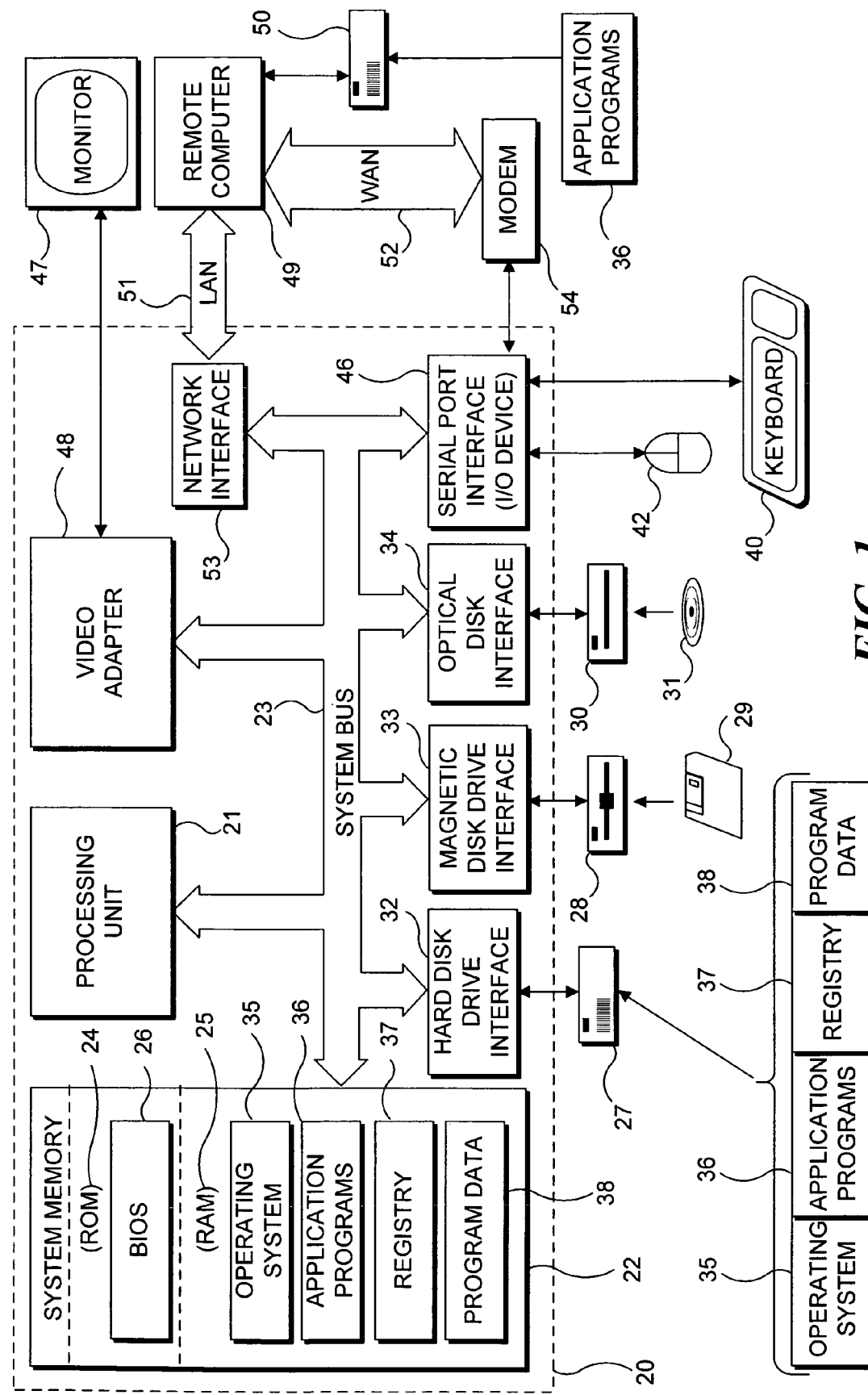
FIG. 1 is a block diagram of a computer that provides the exemplary operating environment for the present invention.

The present invention is directed to a method for automatically updating a computer registry when an application program module is booted. In one embodiment, the invention is incorporated into a computer system and is a method for automatically registering resources required for an application program module to execute. After the application program module is booted, a registration cache is examined to determine its status. The registration cache is stored in association with the application program module and indicates whether a registry on the computer system needs to be updated. For example, after the user has moved files or renamed files registry keys in the registry may no longer be valid and the registry may need to be updated. If the registration cache indicates that the registry needs to be updated, then a search is made through a predetermined directory, such as the application program module folder. The search is looking for an application file or a dynamic link library file. Upon detecting an application file or a dynamic link library file, then a resource fork in association with the file is opened and it is determined whether there is a self-registration resource in the resource fork. If so, then the self-registration resource is registered by initiating a self registration dynamic link library. It is also determined whether there is an OTLB resource in the resource fork and if so, then registering the OTLB resource by initiating an OLE call. The invention may be incorporated into the "MACOFFICE 98" program module. However, it should be understood that any application program module may perform the steps of the invention described herein.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. In one embodiment, the invention is incorporated into the "MACOFFICE 98" program module, marketed and developed by Microsoft Corporation of Redmond, Washington. Briefly described, the "MACOFFICE 98" program module is a suite of word processing, spreadsheet, presentation, and time management application programs along with program modules that integrate and enhance these application programs. While the invention will be described in the general context of the "MACOFFICE 98" program module running in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, such as the "MACOFFICE 98" program module (not shown), program data 38, and other program modules (not shown).

The RAM 25 may also include a registry 37. The registry is a database repository for information about a computer's configuration. It is organized in a hierarchical structure, and is comprised of subtrees and their keys, hives, and value entries.

The registry keys, or keys, contain information that may be required for an application to run. Registry Keys are often paths to specific files.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Automatically Updating a Computer Registry

The invention is a method for automatically updating a computer registry when an application program module is booted. Broadly stated, the problem solved by one embodiment of the present invention is the problem caused when a user moves a file and/or folder, renames a file or volume, or similarly changes the state of a computer. When certain changes occur, a program module may not be able to function properly because the registry keys it uses may no longer be valid. Embodiments of the present invention address the problem of a program module being able to locate a needed resource by automatically updating the registry when the program module is booted so that the paths contained in the registry remain valid. Before proceeding with a more detailed description of the invention, it will prove helpful to generally describe a directory tree structure and the problems associated with the directory tree structure and the registry in the prior art.

Figure 2A:
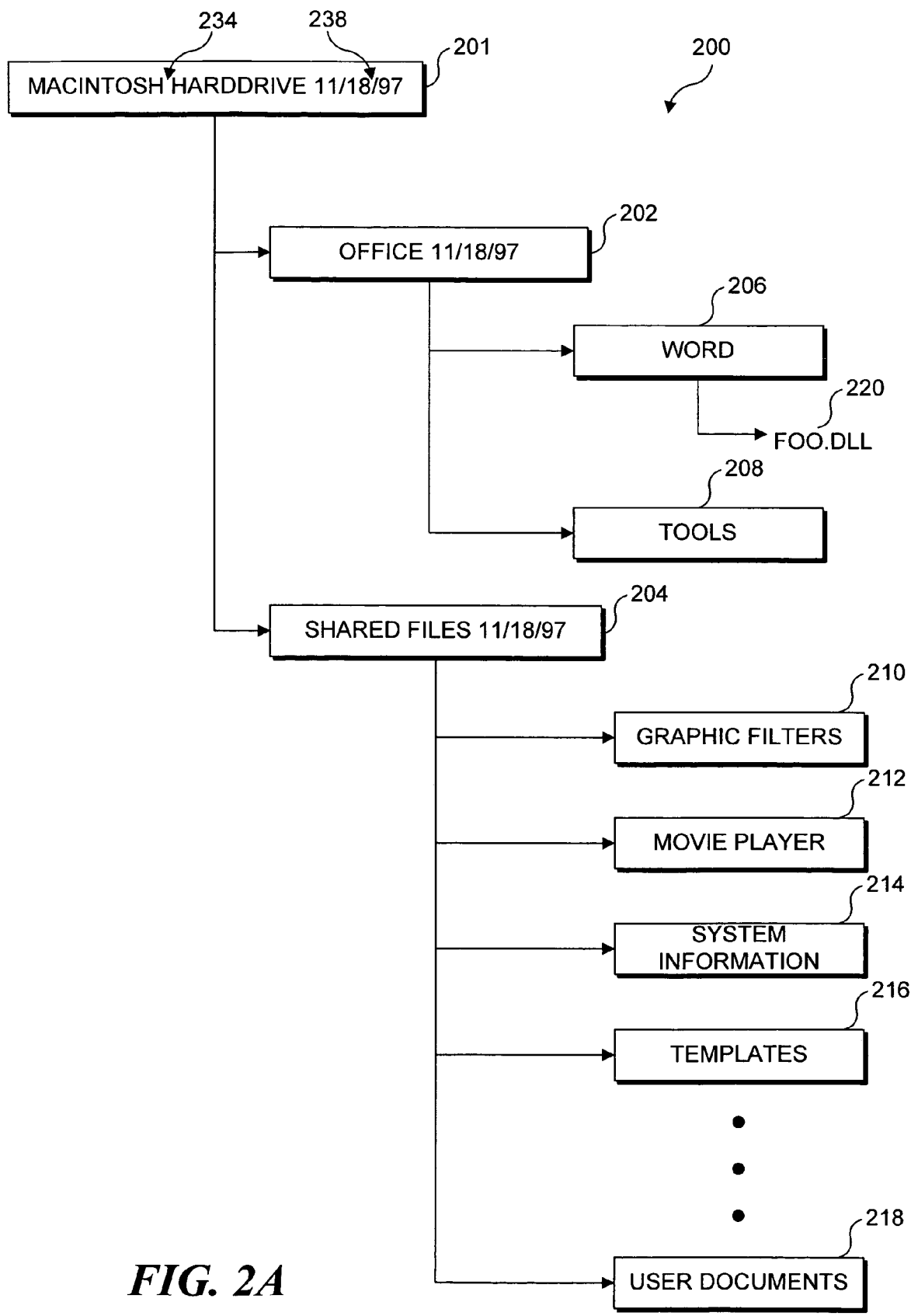
FIG. 2a is a block diagram of an exemplary directory tree structure.

Computer files are typically organized within a 35 directory tree structure. The operating system 35 (FIG. 1) permits the user to organize files saved on a hard drive in a tree structure in order to facilitate the location of files when they are needed. FIG. 2a depicts a block diagram illustrating an exemplary portion of a directory tree structure 200. In this block diagram, the directories (i.e., folders) are represented by directory names in rectangles (201-218). A file is represented by a file name standing alone (220). Directories can contain other directories or files.

The directory tree structure 200 provides a means for maintaining the files 220 and directories 201-218 in a structured hierarchy. A directory that contains other directories and/or files is referred to as a parent directory with respect to the directories and/or files that it contains. In the example depicted in FIG. 2a, the MACINTOSH HARDDRIVE directory 201 is the parent directory of the OFFICE directory 202 and the SHARED FILES directory 204. The OFFICE directory 202 is the parent directory of the WORD directory 206 which is, itself, the parent directory of the file foo.dll 220.

In the directory tree structure depicted in FIG. 2a, some directories have been assigned a modification date, such as modification date 238 of Nov. 18, 1997, indicating that the directory was last modified on Nov. 18, 1997. The modification date means that nothing has been added, removed, or modified within the files and directories that have the MACINTOSH HARDDRIVE directory 201 as a parent directory since the modification date. It should be understood that the modification date is not actually a date, but rather a well-known computer term meaning the number of seconds that have passed since a given operating system's baseline date. For the MACINTOSH operating system, the modification date is the number of seconds that have passed since Jan. 1, 1904. Other operating systems use similar schemes but have different baseline dates.

Ideally, the files and directories installed on a computer are maintained in their installed locations and maintain their original names. If the files and directories are never moved or never changed in name, then application program modules should have very few problems locating files and directories in their installed locations.

However, many users move files and directories from their installed locations to other locations within the directory tree structure. In still other cases, users rename files or folders. In such cases, the new location or new name of the file or directory is unknown to the application program, so the file or directory is not readily accessible. Typically, the new location or name of the file or directory must be re-registered in the computer's registry, such as by calling the selfreg.dll. However, many users are unaware of the selfreg.dll and its purpose. It should also be understood that the selfreg.dll may not be simply called by the MACINTOSH user.

For example, referring to FIG. 2a, suppose a "WORD" application program module requires the dynamic link library, foo.dll 220, to run. When the "WORD" application program module is first installed, the installer program module registers the following registry key for the foo.dll, based upon a pre-authored list of keys built into the installer program module:

WhereIsFoo=Macintosh HD: Office:Word:foo.dll

The installer program module registers the key WhereIsFoo during installation, and sets the value equal to the path to foo.dll. In this example, foo.dll is located on the directory "Macintosh HD" 201, in the folder "Office" 202, in the folder "Word" 206 and is named "foo.dll".

The "WORD" application program module uses this key each time that it boots to find the location of foo.dll. Suppose the user renames the Hard Drive from "Macintosh HD" to "New Name". The "WORD" program module will continue to attempt to load the file foo.dll from the Hard Drive "Macintosh HD" which no longer exists. This is because the path to foo.dll was not changed in the registry when the name of the hard drive was changed. Thus, the "WORD" program module will not be able to find foo.dll and will exhibit unpredictable symptoms, including possibly crashing and not booting.

Figure 2B:
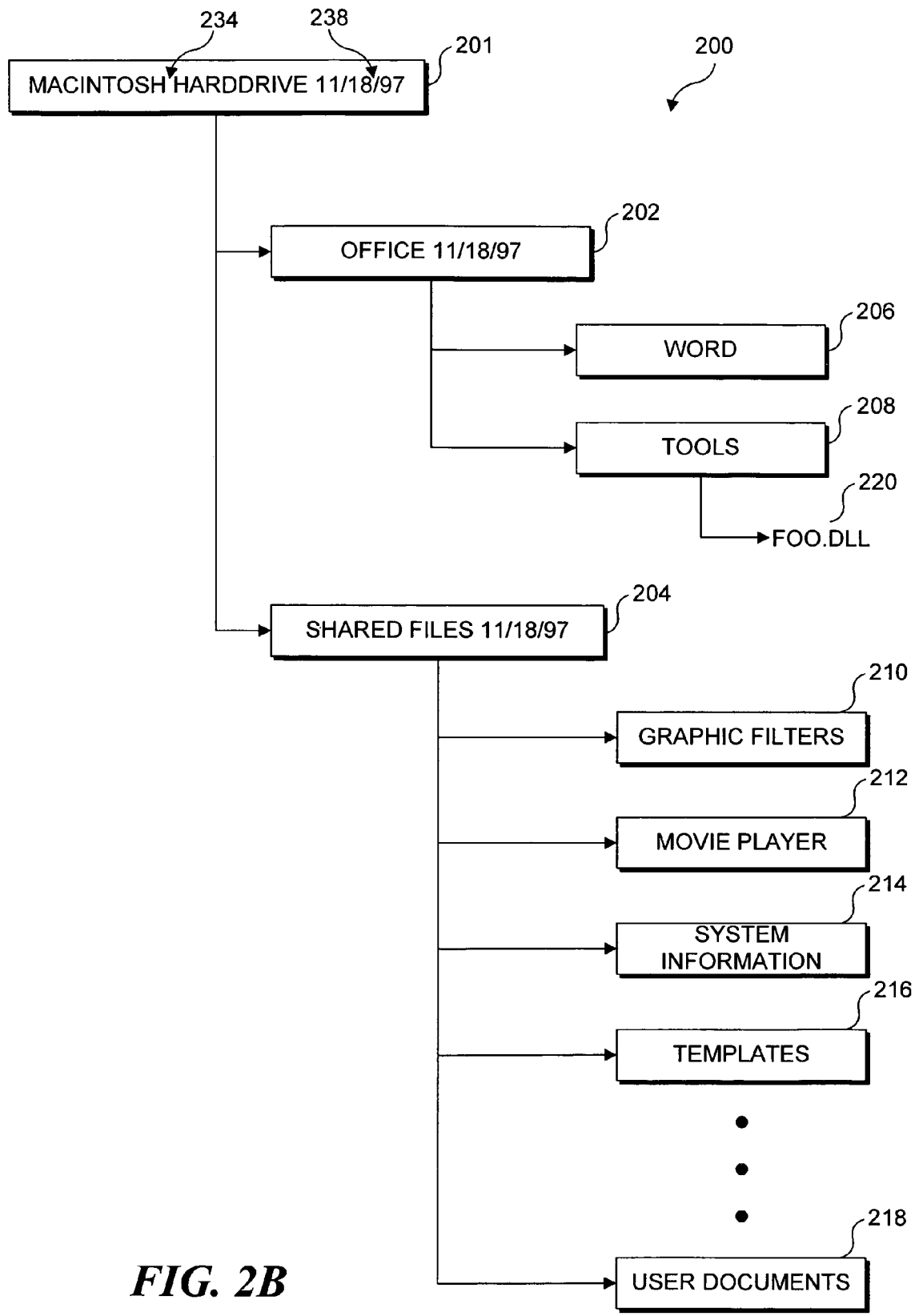
FIG. 2b is a block diagram of an exemplary directory to tree structure that has been modified.

Referring now to FIG. 2b, suppose the user moves the foo.dll 220 to the tools directory 208. The "WORD" program module will continue to search the folder "Word" 206 to attempt to find foo.dll. This is because the path to foo.dll was not changed in the registry when the foo.dll 220 was moved.

This is the case for all scenarios where the path name to the file changes, including folder name changes, file name changes, etc. In the prior art, the only way to fix this was to reinstall the "WORD" application program module or explicitly call the selfreg.dll so that the registry may be updated. The installer program module would then take into account the new variables and would set the keys accordingly.

The present invention eliminates the need for a user to explicitly call the selfreg.dll to update a computer registry. The forced user action of calling the selfreg.dll in the prior art caused confusion because the user had to understand what the selfreg.dll is, or at least understand that they needed to call the selfreg.dll to fix a problem. Thus, the present invention solves the need for a method for automatically updating a registry without requiring user action.

In one embodiment, the present invention also places the "MACINTOSH" selfreg.dll into "MACINTOSH" OLE, which is considered system software, and, thus, is always available. This removes the need found in the prior art for a user to install the selfreg.dll, the possibility of the selfreg.dll being deleted, and the possibility of the selfreg.dll being moved.

The present invention also builds the .srg files into the resource fork of the application or dynamic link library file itself, (SReg resource). A .srg file is a pre-authored text file containing registry keys. Building the .srg files into the resource fork removes the possibility of the .srg files becoming out of sync with the .dll, the .srg files being moved, the .srg files being deleted, and eliminates the need to install a .srg file.

Instead of an installer program module calling the selfreg.dll and initiating the self registration process, the present invention includes a trigger to initiate the selfreg.dll. In one embodiment, it is determined whether the modification date of the "MACOFFICE 98" folder has changed from the last boot. If the modification date has changed, then it is determined if the number of .dlls within the directory has changed as well. If so, it is known that the user has added or removed a .dll and that the self-registration process should be performed. It is then determined whether there is a file location change, and if so, the self registration process is performed. Examples of file location changes are volume name changes (local, server, etc.), folder name changes, and other name changes. It should be understood that the triggering mechanism may be based on any variables that the application developer specifies.

It should also be understood that the modification dates of the application files, such as "WORD", "EXCEL", and "POWERPOINT", along with the modification date of the "OFFICE" folder are stored. It should also be understood that the number of dynamic link libraries in the "OFFICE" folder is stored.

In one embodiment, the logic for the trigger mechanism determines whether the path has changed, whether new applications have appeared, and whether the "OFFICE" folder modification date has changed and, if so, whether the number of shared libraries in it has changed.

Once triggered, an iterative search is performed on a predefined location, such as the "MACOFFICE" 98 folder. All SReg resources within this predefined location are registered by calling the selfreg.dll. At the same time, all Type Libraries (OTLB resources) that are found are also registered by initiating an OLE call (RegisterType1ib).

Figure 3:
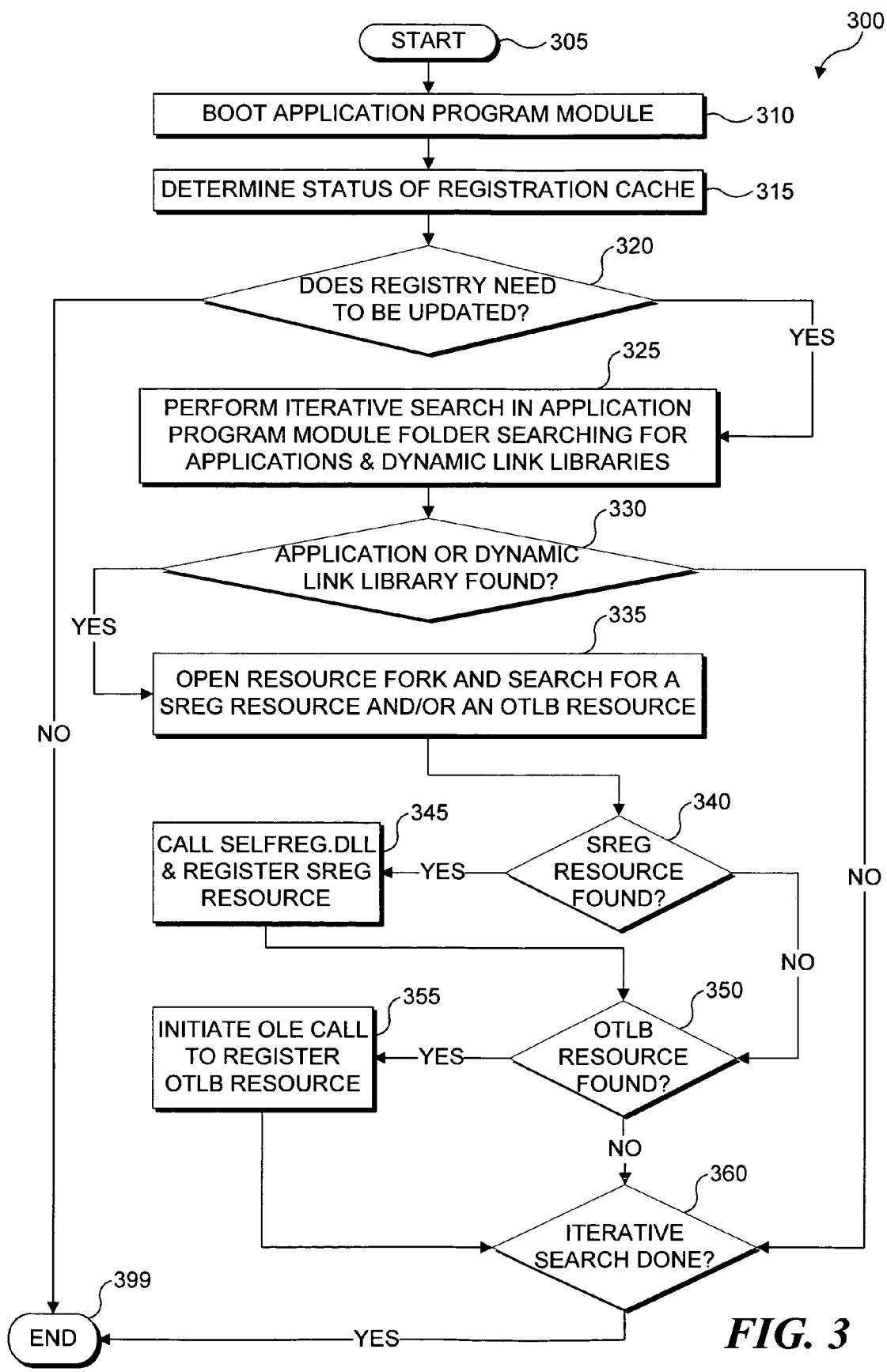
FIG. 3 is a flowchart illustrating a method for updating a registry in accordance with an embodiment of the present invention.

Referring now to FIG. 3, a flowchart illustrating a method 300 for automatically updating a registry in accordance with an embodiment of the present invention is illustrated. In one embodiment, the registry resides in a Preferences folder in a Systems folder of the computer. The method 300 begins at step 305 and proceeds to step 310 where an application program module is booted. In one embodiment, the application program module is the "MACOFFICE 98" program module. After the application program module is booted at step 310, the method proceeds to step 315.

At step 315, the status of a registration cache is determined. The registration cache is the trigger determining whether or not to update the registry. In one embodiment, the cache stores information to determine whether the state of the application program module folder(s) is in the same condition as it was the last time the application program module was booted. For example, the cache may track the files that have been registered, when the files were registered, and where the files were previously located. In another embodiment, the cache maintains information regarding where the application program module folder was the last time the application program module was booted so that it may be determined if the application program module folder has been moved. In another embodiment, the cache maintains information regarding the modification date of the application program module folder the last time the application program module was booted so that it may be determined if the application program module folder has been modified since then. In one embodiment, the registration cache is stored in a "MACOFFICE 98" registration cache file in the Preferences folder of the System folder.

The method 300 then proceeds to decision step 320. At decision step 320 it is determined whether the registry needs to be updated. Typically, this determination is made by examining the registration cache and determining whether any information stored in the cache has changed since the last boot of the application program module.

It should also be understood that a determination at 35 decision step 320 that the registry needs to be updated may also be made because the registration cache no longer exists or because the registration database no longer exists.

If it is determined at decision step 320 that the registry does not need to be updated, then the method 300 ends at step 399.

However, if at decision step 320 it is determined that the registry needs to be updated, then the method 300 proceeds to step 325.

At step 325, an iterative search is performed in the application program module folder searching for applications and dynamic link libraries. The method then proceeds to decision step 330.

At decision step 330, it is determined whether an application or a dynamic link library was found in the iterative search. If not, then the method proceeds to decision step 360. However, if at decision step 330 it is determined that an application or a dynamic link library was found in the iterative search, then the method 300 proceeds to step 335.

At step 335, a resource fork of the found application or dynamic link library is opened and a search of the resource fork is performed for a SReg resource and/or an OTLB resource. A resource fork is one of the two forks of a typical APPLE MACINTOSH file. The resource fork of a file typically contains reusable items of information that the program can use during the course of execution. Dozens of types of resources can be found in a resource fork, such as blocks of program instructions, fonts, icons, windows, dialog boxes, and menus. A SReg resource is DOS text that is passed to the MACINTOSH version of selfreg.dll and describes what registry keys to add to the registry. An OTLB resource is a resource containing binary data which describes how to register an OLE type library. A Type Library is a portion of an application which contains data which informs Visual Basic of the application's VB grammar. The method then proceeds to decision step 340.

At decision step 340, it is determined whether a SReg resource was found at step 335. If not, then the method 300 proceeds to decision step 350. However, if at decision step 340 it is determined that a SReg resource was found, then the method proceeds to step 345.

At step 345, a self registration dynamic link library, or selfreg.dll, is called and the SReg resource is registered. The selfreg.dll is well-known to those skilled in the art. Typically, the SReg resources are registered by opening the SReg resource and registering the keys in the SReg resource. The method then proceeds to decision step 350.

At decision step 350, it is determined whether an OTLB resource was found at step 335. If not, then the method 300 proceeds to decision step 360. However, if at decision step 350 it is determined that an OTLB resource was found, then the method proceeds to step 355.

At step 355, an Object Linking and Embedding call, or OLE call, is initiated and the OTLB resource is registered. The OLE call is named RegisterTypelib and is well-known to those skilled in the art. The method then proceeds to decision step 360.

At decision step 360, it is determined whether the iterative search referred to at step 325 has been completed. If not, then the method 300 returns to step 325 and the application program module folder is searched for more applications and dynamic link libraries. However, if at decision step 360 it is determined that the iterative search is complete, then the method 300 ends at step 399.

Thus, from the foregoing description, it will be apparent to those skilled in the art that the present invention provides a method for automatically updating a registry when an application program module is booted.

It should be understood that the present invention is entirely data driven. The present invention does not require any previous knowledge of a dynamic link library's existence, nor does it matter what dynamic link libraries are located in the predefined location that is iteratively searched. The present invention will register every application and dynamic link library that has a SReg resource in the predefined location and every Type Library that has an OTLB resource.

It should also be understood that alternative embodiments will become apparent to those skilled in the art to which the present invention pertains without departing from its spirit and scope. Accordingly, the scope of the present invention is defined by the appended claims rather than the foregoing description.

The invention in which an exclusive right is claimed is defined by the following:

1. A method for automatically updating a portion of a system registry of a computing device based upon an occurrence of a predefined event that affects the proper functioning of an application program module in the computing device, comprising the steps of:
   building a portion of self-registration data into a resource fork of the application program module, the self-registration data being automatically updatable to be in sync with one or more corresponding linking files of the application program, the self-registration data being part of the resource fork of the application program module such that explicit calls to separate self-registration files are avoided;
   determining that the predefined event that affects the proper functioning of the application program module in the computing device has occurred; and if so,
   determining whether the portion of the system registry of the computing device needs to be updated because at least one of the following conditions exists:
      any information in a registration cache has changed; and
      a registration cache does not exist; and if so,
   automatically updating the portion of the system registry by referring to the corresponding self-registration data built into the resource fork of the application program module.

2. The method of claim 1, wherein the step of determining that the predefined event that affects the proper functioning of the application program module comprises one of the steps of:
   determining that a condition of at least one of an application program module folder, and a file, and a directory has changed;
   determining that a storage path for at least one of the application program module folder, and the file, and the directory has changed;
   determining that at least one of the application program module folder, and the file, and the directory has been modified;
   determining that at least one of the application program module folder, and the file, and the directory has been renamed;
   determining that a hard drive of the computing device has been renamed;
   determining that a new operating system has been installed;
   determining that an operating system has been reinstalled;
   determining that the application program module has been executed;
   determining that an installer application program module has been moved to a different hard drive on the computing device;
   determining that a system administrator has pushed the application program module to a user;
   determining that a modification date of at least one of the application program module folder, and the file, and the directory has been changed;
   determining that a variable specified by a developer of the application program module has changed; and
   determining that a different application has been loaded on the computing device.

3. The method of claim 1, wherein the registration cache IS specific to the application program module.

4. The method of claim 1, wherein the step of determining whether the portion of the system registry of the computing device needs to be updated comprises the step of examining the information in the registration cache that has changed, to determine if the change should be reflected in the system registry.

5. The method of claim 1, wherein the step of determining whether the portion of the system registry of the computing device needs to be updated comprises the step of accessing the portion of the system registry in order to change that portion to include the change in the information stored in the registration cache.

6. The method of claim 1, wherein the step of updating comprises the step of updating the portion of the system registry such that it substantially matches the information of said registration cache that has changed.

7. The method of claim 1, wherein the step of updating comprises the steps of:

searching through a predetermined folder for one of an application file and a dynamic link library file;

upon detecting one of the application file and the dynamic link library file, opening a resource fork in association with the application file;

determining whether there is a self-registration resource in the resource fork; and if there is a self-registration resource in the resource fork, then automatically registering the self-registration resource in the system registry.

8. The method of claim 7, wherein the step of registering the self-registration resource comprises the step of initiating a dynamic link library routine.

9. The method of claim 8, wherein the dynamic link library routine is selfreg.dll.

10. The method of claim 7, further comprising the steps of:

determining whether there is an Object Linking and Embedding (OLE) Type Library (OTLB) resource in the resource fork; and if there is an OTLB resource III the resource fork, then automatically registering the OTLB resource in the system registry.

11. The method of claim 10, wherein the step of automatically registering the OTLB resource comprises the step of initiating an OLE call.

12. The method of claim 10, wherein the OLE call is RegisterTypeLib.

13. A memory medium having machine executable instructions for carrying out the steps of claim 1.

14. A system for automatically updating a portion of a system registry based of the system upon an occurrence of a predefined event that affects the proper functioning of an application program module in the system, comprising:

a memory that stores:

a system registry;

a registration cache; and the application program module; and a processor coupled to the memory, wherein the memory stores machine instructions causing the processor to:

build a portion of self-registration data into a resource fork of the application program module, the self-registration data being automatically updatable to be in sync with one or more corresponding linking files of the application program, the self-registration data being part of the resource fork of the application program module such that explicit calls to separate self-registration files are avoided;

determine that the predefined event that affects the proper functioning of the application program module in the system has occurred; and if so, determine whether the portion of the system registry of the system needs to be updated because at least one of the following conditions exists:

any information in a registration cache has changed; and a registration cache does not exist; and if so, automatically update the portion of the system registry by referring to the corresponding self-registration data built into the resource fork of the application program module.

15. A computer program product for implementing a method for automatically updating a portion of a system registry of a computing device based upon the activation of a user-defined trigger, the computer program product comprising one or more computer-readable media having thereon computer-executable instructions that, when executed by one or more processors of the computing system, cause the computing system to perform the method, the method comprising:

building a portion of self-registration data into a resource fork of the application program module, the self-registration data being automatically updatable to be in sync with one or more corresponding linking files of the application program, the self-registration data being part of the resource fork of the application program module such that explicit calls to separate self-registration files are avoided;

determining that the predefined event that affects the proper functioning of the application program module in the computing device has occurred; and if so, determining whether the portion of the system registry of the computing device needs to be updated because at least one of the following conditions exists:

any information in a registration cache has changed;

a user-configured trigger has been activated; and a registration cache does not exist; and if so, automatically updating the portion of the system registry by referring to the corresponding self-registration data built into the resource fork of the application program module.

16. The computer program product of claim 15, wherein the user-configured trigger comprises a determination that a modification date of a specified folder has changed since the last boot.

17. The computer program product of claim 15, wherein the user-configured trigger comprises a determination that a modification date of a specified file has changed since the last boot.

18. The computer program product of claim 15, wherein the user-configured trigger comprises a determination that the number of DLL files within a specified folder has changed since the last boot.

19. The computer program product of claim 15, wherein the user-configured trigger comprises a determination that the state of the registration cache has changed since the last boot.

20. The computer program product of claim 15, wherein the self-registration files are built in to a self-registration dynamic link library file.

21. The computer program product of claim 20, wherein activation of the trigger initiates execution of the self-registration dynamic link library file.

22. The computer program product of claim 15, wherein the resource fork comprises a plurality of reusable information items that the application program module can use during the course of execution.

23. The computer program product of claim 22, wherein the resource fork's information items include at least a plurality of the following: blocks of program instructions, fonts, icons, windows, dialog boxes, and menus.

* * * * *